US008526730B2

(12) United States Patent
Hashimoto et al.

(10) Patent No.: US 8,526,730 B2
(45) Date of Patent: Sep. 3, 2013

(54) IMAGE PROCESSING APPARATUS AND METHOD OF PROCESSING COLOR IMAGE DATA THAT PERFORM OVERDRIVE

(75) Inventors: Junji Hashimoto, Chiba (JP); Jun Ando, Chiba (JP)

(73) Assignee: MegaChips Corporation, Osaka-shi (JP)

( * ) Notice: Subject to any disclaimer, the term of this patent is extended or adjusted under 35 U.S.C. 154(b) by 123 days.

(21) Appl. No.: 13/085,012

(22) Filed: Apr. 12, 2011

(65) Prior Publication Data

US 2011/0255778 A1 Oct. 20, 2011

(30) Foreign Application Priority Data

Apr. 14, 2010 (JP) .................................. 2010-93036

(51) Int. Cl.
*G06K 9/00* (2006.01)

(52) U.S. Cl.
USPC ........................................................ 382/167

(58) Field of Classification Search
USPC .................. 382/162, 166–167; 358/1.9, 2.1, 358/518–520; 348/229.1, 364; 345/581
See application file for complete search history.

(56) References Cited

U.S. PATENT DOCUMENTS 5,982,424 A * 11/1999 Simerly et al. ............ 348/229.1
8,098,256 B2 * 1/2012 Zipnick et al. ............... 345/581
2005/0008078 A1 1/2005 Kurumisawa

FOREIGN PATENT DOCUMENTS

JP A-6-237396 8/1994

* cited by examiner

*Primary Examiner* — Jose Couso
(74) *Attorney, Agent, or Firm* — Oblon, Spivak, McClelland, Maier & Neustadt, L.L.P.

(57) ABSTRACT

Image processing apparatuses and methods of processing color image data that perform overdrive are provided. The apparatuses include a restoration block that restores R-, G-, and B-element values of respective pixels of previous one of successive frames based on Y-element values of the respective pixels of the previous one of the successive frames and the color image data of a current one of the successive frames. The apparatus further includes a correction block that compares the R-, G-, and B-element values of the respective pixels of the previous one of the successive frames that the restoration block restored and R-, G-, and B-element values of corresponding pixels of the current one of the successive frames and generates the corrected color image data.

16 Claims, 6 Drawing Sheets
(2 of 6 Drawing Sheet(s) Filed in Color)

Related Art

IMAGE PROCESSING APPARATUS AND METHOD OF PROCESSING COLOR IMAGE DATA THAT PERFORM OVERDRIVE

The application claims benefit of Japanese Application No. JP-A-2010-93036. The disclosure of the prior application is hereby incorporated by reference in its entirety.

BACKGROUND

This disclosure relates to image processing apparatuses and methods of processing color image data that successively receive color image data of successive frames, correct the received color image data in accordance with differences of the image between frames, and output corrected color image data.

Liquid crystal display panels have a characteristic that ON-OFF response time of liquid crystal cells is longer than a frame period of moving images. In order to shorten the response time of liquid crystal cells of the display panel, an overdrive technique is widely utilized. That is, color image data of the previous frame is stored in a frame memory and compared with color image data of the current frame, and corrections are made in accordance with changes of the image between the frames.

FIG. 8 is a block diagram that shows a construction of a conventional image processing apparatus that performs overdrive. The image processing apparatus 30 shown in FIG. 8 includes a frame memory 34, OD amount calculation block 36 that calculates amounts of overdrive, and an adder 38.

Color image data of the current frame (RGB input) is stored in the frame memory 34. The OD amount calculation block 36 calculates amounts of overdrive based on R-, G-, and B-element values of respective pixels of a previous frame read from the frame memory 34 and R-, G-, and B-element values of corresponding pixels of the current frame. Corrected color image data (RGB output) is generated by adding, by using the adder 38, R-, G-, and B-element values of respective pixels of the current frame and the calculated overdrive amounts and output.

The frame memory 34 that stores color image data of the previous frame need to have a large memory capacity in order to store R-, G-, and B-element values of respective pixels. In order to reduce a required capacity of the frame memory, Japanese Laid-open Patent JP 6-237396 (Patent document 1) proposes to perform a high-rate compression of input image signal and to store the compressed image information in the frame memory. However, rate of reduction of the memory capacity in the technique proposed by Patent Document 1 is limited by the limitation of compression rate.

On the other hand, US Patent Publication US 2005-008078 (Patent document 2) proposes to supply Y-element values alone from the frame memory and to perform LAO (level-adaptive overdrive) process only to the Y-element values. According to Patent document 2 (3rd embodiment and FIG. 5), a human eye recognizes a significant improvement of display characteristic by performing LAO process only to Y-element (luminance element). Accordingly, amount of task of the LAO process block can be decreased.

The technique proposed by Patent document 2 only requires storing Y-element values in the frame memory. Accordingly, it enables to reduce the capacity of the frame memory by ⅓ compared with a case that all of R-, G-, and B-element values are stored. However, when the overdrive is performed by only using Y-element values as the previous frame color image data, display quality may be degraded due to, for example, color blurring at boundaries between objects with different colors.

SUMMARY

It would be advantageous to provide image processing apparatuses and methods of processing color image data that can reduce capacity of frame memory without degrading display quality.

This disclosure provides image processing apparatuses and methods of processing color image data that restore R-, G-, and B-element values of respective pixels of previous one of successive frames based on Y-element values of the respective pixels of the previous one of the successive frames and color image data of a current one of the successive frames. The apparatuses and methods further compare the restored R-, G-, and B-element values of the respective pixels of the previous one of the successive frames and R-, G-, and B-element values of corresponding pixels of the current one of the successive frames to generate corrected color image data.

Various exemplary embodiments of this disclosure provide image processing apparatuses that receive color image data of successive frames and output corrected color image data. The apparatuses may include a restoration block and a correction block. The restoration block restores R-, G-, and B-element values of respective pixels of previous one of the successive frames based on the Y-element values of the respective pixels of the previous one of the successive frames, which may be read from a frame memory, and the color image data of a current one of the successive frames, which is next to the previous one of the successive frames. The correction block compares the R-, G-, and B-element values of the respective pixels of the previous one of the successive frames that the restoration block restored and R-, G-, and B-element values of corresponding pixels of the current one of the successive frames and generates the corrected color image data.

According to some exemplary embodiments, the restoration block may restore the R-, G-, and B-element values of the respective pixels of the previous one of the successive frames based on the R-, G-, and B-element values of the corresponding pixels of the current one of the successive frames and the Y-element values of the respective pixels of the previous one of the successive frames.

According to some exemplary embodiments, the restoration block may include a UV element value generation circuit that generates U- and V-element values of the corresponding pixels of the current one of the successive frames based on the R-, G-, and B-element values of the corresponding pixels of the current one of the successive frames, and the restoration block may restore the R-, G-, and B-element values of the respective pixels of the previous one of the successive frames based on the U- and V-element values of the corresponding pixels of the current one of the successive frames that the UV element value generation circuit generated and the Y-element values of the respective pixels of the previous one of the successive frames.

According to some exemplary embodiments, the restoration block may include a Y element value generation circuit that generates Y-element values of the corresponding pixels of the current one of the successive frames based on the R-, G-, and B-element values of the corresponding pixels of the current one of the successive frames, and the restoration block may restore the R-, G-, and B-element values of the respective pixels of the previous one of the successive frames based on the Y-element values of the corresponding pixels of the current one of the successive frames that the Y element value generation circuit generated, the Y-element values of the respective pixels of the previous one of the successive frames, and the R-, G-, and B-element values of the corresponding pixels of the current one of the successive frames.

According to some exemplary embodiments, the apparatuses may further include a compression block that compresses received color image data into a first compressed image data that includes one of i) R-, G-, and B-element values and ii) Y-, U-, and V-element values and a second compressed image data that only includes Y-element values, and selects one of the first and second compressed image data to be stored in a frame memory. The compression block may further include an evaluation circuit that performs an evaluation of at least one of the received color image data and the first compressed image data and performs a selection of one of the first and second compressed image data based on a result of the evaluation, and a detection circuit that detects a start of each of the frames in the received color image data and permits the evaluation circuit to update the selection only during a predetermined first period in each of the frames.

Various exemplary embodiments of this disclosure may also provide methods of processing color image data that include receiving color image data of successive frames, storing Y-element values of respective pixels of a previous one of the successive frames in a frame memory, and restoring R-, G-, and B-element values of the respective pixels of the previous one of the successive frames based on the Y-element values of the respective pixels of the previous one of the successive frames read from the frame memory and the color image data of a current one of the successive frames. The methods may further include comparing the restored R-, G-, and B-element values of the respective pixels of the previous one of the successive frames and R-, G-, and B-element values of corresponding pixels of the current one of the successive frames to generate a corrected color image data, and outputting the corrected color image data.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Various exemplary embodiments of this disclosure will be described in detail with reference to the following figures, wherein like numerals reference like elements, and wherein.

DETAILED DESCRIPTION OF EMBODIMENTS

Figure 1:
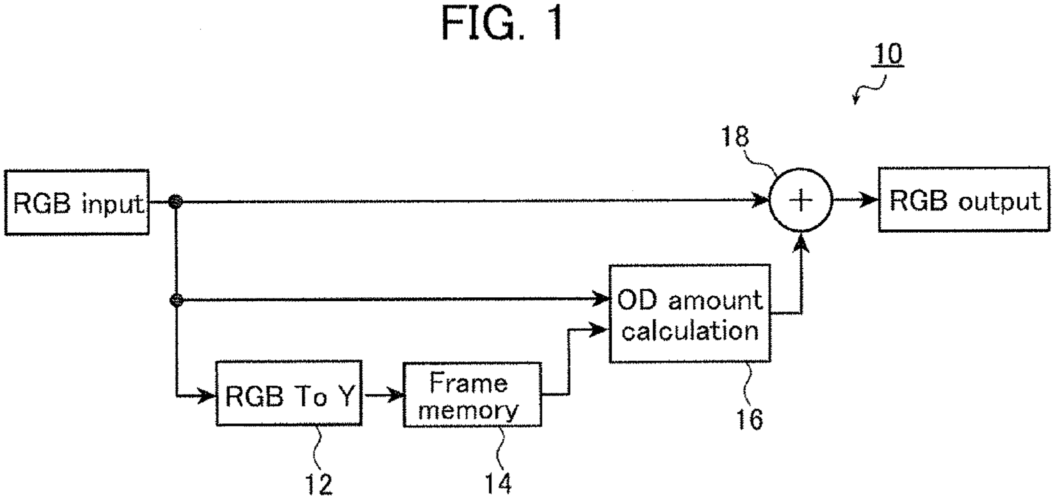
FIG. 1 is a schematic block diagram that shows a construction of an exemplary image processing apparatus according to this disclosure.

FIG. 1 is a schematic block diagram that shows a construction of an exemplary image processing apparatus according to this disclosure. The exemplary image processing apparatus 10 shown in FIG. 1 receives color image data of successive frames, performs corrections in accordance with changes of the image between the frames, and outputs corrected color image data. The exemplary image processing apparatus includes a Y element value generation circuit (RGB to Y) 12, a frame memory 14, an overdrive amounts calculation block 16, and an adder 18.

The Y element value generation circuit 12 generates values of Y elements (Y-element values) from values of R, G, and B elements (R-, G-, and B-element values) of respective pixels in a current frame included in the color image data (RGB input). Any methods for generating Y-element values may be used. In this exemplary embodiment, Y-element values are calculated using an equation of $Y=0.299R+0.587G+0.114B$, where R, G, and B represents values of R, G, and B elements.

The frame memory 14 is a semiconductor memory that stores Y-element values of pixels constituting a frame received from the Y element value generation circuit 12. Stored Y-element values of respective pixels constituting a frame are read from the frame memory at timings of one-frame period later than the input of the R-, G-, and B-element values of respective pixels. As a result, Y-element values of pixels of a previous frame are read from the frame memory 14. In other words, the frame memory 14 stores Y-element values of pixels of a previous frame when the values are read.

The OD amount calculation block 16 restores R-, G-, and B-element values of respective pixels of the previous frame based on Y-element values of respective pixels of the previous frame read from the frame memory 14 and R-, G-, and B-element values of corresponding pixels of the current frame. That is, the OD amount calculation block 16 includes a restoration block that restores R-, G-, and B-element values of pixels of the previous frame. Then, the OD amount calculation block calculates overdrive amounts for respective pixels of the current frame based on the restored R-, G-, and B-element values of respective pixels of the previous frame and R-, G-, and B-element values of corresponding pixels of the current frame.

Finally, the adder 18 adds the overdrive amounts for respective pixels of the current frame that the OD amount calculation block 16 calculated and R-, G-, and B-element values of corresponding pixels of the current frame to generate corrected color image data (RGB output) for overdriving a liquid crystal display.

That is, a combination of the OD amount calculation block 16 and the adder 18 constitutes an exemplary correction block, which compares values of RGB elements of pixels constituting the previous frame and values of RGB elements of corresponding pixels constituting the current frame and generates corrected image data. The correction block may have various different constructions. For example, it is not necessary to generate the corrected color image data by generating amounts of overdrive in the OD amount calculation block 16 and adding the generated amounts to R-, G-, and B-element values of the current frame. That is, the OD amount calculation block 16 may generate the corrected color image data to which the overdrive amounts are added.

Figure 2:
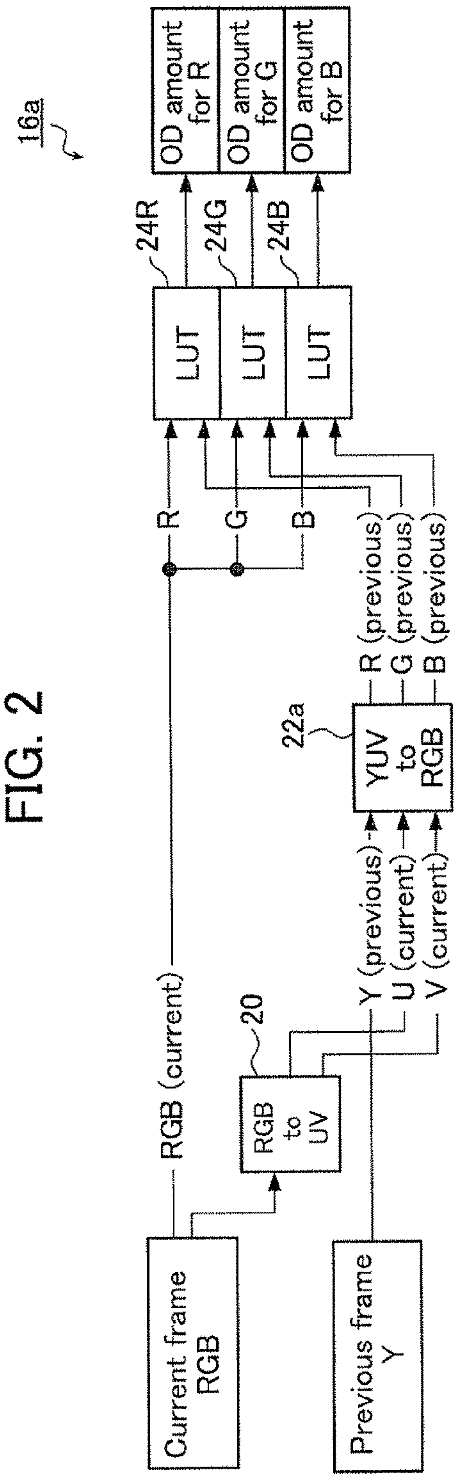
FIG. 2 is a block diagram that shows an exemplary construction of the OD amount calculation block shown in FIG. 1.

Next, exemplary embodiments of the OD amount calculation block 16 will be explained. FIG. 2 is a block diagram that shows an exemplary construction of the OD amount calculation block shown in FIG. 1. The exemplary OD amount calculation block 16*a* includes UV element value generation circuit (RGB to UV) 20, RGB element value restoration circuit (YUV to RGB) 22*a*, and three look-up tables (LUT) 24R, 24G, and 24B provided for R, G, and B elements, respectively.

The UV element value generation circuit 20 generates U- and V-element values of pixels of the current frame from R-, G-, and B-element values of pixels of the current frame (current frame RGB). Here, U- and V-element values may be generated from R-, G-, and B-element values using various techniques. For example, U- and V-element values may be generated from R-, G-, and B-element values using equations similar to the equation for Y-element values explained above.

The RGB element value restoration circuit 22*a* restores R-, G-, and B-element values of respective pixels of the previous frame based on i) the Y-element values of respective pixels of the previous frame read from the frame memory 14 (previous frame Y) and ii) the U- and V-element values of corresponding pixels of the current frame generated by the UV element value generation circuit 20. That is, the UV element value generation circuit 20 and the RGB element value restoration circuit 22*a* constitute an exemplary restoration block that restores R-, G-, and B-element values of the previous frame.

The look-up tables 24R, 24G, and 24B compare R-, G-, and B-element values, respectively, of respective pixels of the previous frame that the RGB element value restoration circuit 22*a* restored and R-, G-, and B-element values of corresponding pixels of the current frame. Moreover, the look-up tables 24R, 24G, and 24B generates OD amounts for R, G, and B elements (OD amount for R, OD amount for G, and OD amount for B), respectively, corresponding to R, G, and B elements of respective pixels of the current frame. Here, the look-up-tables 24R, 24G, and 24B constitute an exemplary correction block according to this disclosure that outputs corrected image data.

The OD amount calculation block 16*a* shown in FIG. 2 generates, by using the UV element value generation circuit 20, U- and V-element values of pixels of the current frame from R-, G-, and B-element values of pixels of the current frame. Next, the RGB element value restoration circuit 22*a* generates R-, G-, and B-element values of pixels of the previous frame by using Y-element values of pixels of the previous frame read from the frame memory 14 and U- and V-element values of pixels of the current frame that the UV element value generation circuit 20 generated. Finally, the look-up tables 24R, 24G, and 24B outputs OD amounts for R, G, and B elements, respectively, of respective pixels of the current frame based on R-, G-, and B-element values of respective pixels of the previous frame that the RGB element value restoration circuit 22*a* restored and R-, G-, and B-element values of corresponding pixels of the current frame.

Here, when differences between U- and V-element values of respective pixels of the previous frame and U- and V-element values of corresponding pixels of the current frame are negligibly small, the RGB element value restoration circuit can restore exact R-, G-, and B-element values of the previous frame. Accordingly, it is possible to generate exact OD amounts for the current frame based on the restored R-, G-, and B-element values of respective pixels of the previous frame and R-, G-, and B-element values of corresponding pixels of the current frame.

When differences between U- and V-element values of respective pixels of the previous frame and U- and V-element values of corresponding pixels of the current frame are significantly large, the R-, G-, and B-element values of pixels of the previous frame that the RGB element value restoration circuit 22*a* restored include errors. Accordingly, the OD amounts generated based on the restored R-, G-, and B-element values of respective pixels of the previous frame and R-, G-, and B-element values of corresponding pixels of the current frame include errors.

Nonetheless, errors included in the OD amounts generated based on restored R-, G-, and B-element values of respective pixels of the previous frame and R-, G-, and B-element values of corresponding pixels of the current frame are smaller compared with errors included in OD amounts generated solely based on Y-element values of the previous and current frames. As a result, display quality can be improved. That is, for example, color blurring at boundaries between objects with different colors can be suppressed.

Figure 3:
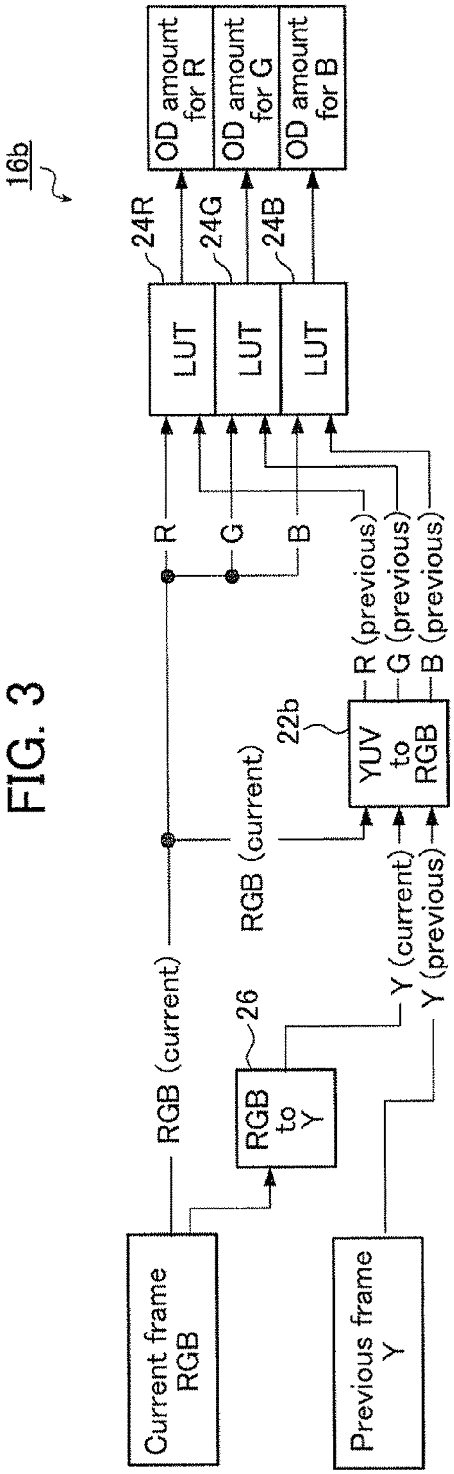
FIG. 3 is a block diagram that shows a construction of another exemplary OD amount calculation block.

Next, another exemplary OD amount calculation block 16 will be explained. FIG. 3 is a block diagram that shows a construction of another exemplary OD amount calculation block. The OD amount calculation block 16*b* includes Y element value generation circuit (RGB to Y) 26, RGB element value restoration circuit (YUV to RGB) 22*b*, and three look-up tables (LUT) 24R, 24G, and 24B provided for respective ones of RGB elements.

The Y element value generation circuit 26 generates Y-element values of pixels of the current frame from R-, G-, and B-element values of pixels of the current frame. The Y element value generation circuit 26 may utilize various techniques of generating Y-element values. For example, the Y element value generation circuit 26 may use the calculation equation described above.

The RGB element value restoration circuit 22*b* restores R-, G-, and B-element values of pixels of the previous frame based on Y-element values of pixels of the previous frame read from the frame memory 14, Y-element values of pixels of the current frame that the Y element value generation circuit 26 generated, and R-, G-, and B-element values of pixels of the current frame. Here, the Y element value generation circuit 26 and the RGB element value restoration circuit 22*b* constitute an exemplary restoration block according to this disclosure.

The look-up tables 24R, 24G, and 24B may have the same constructions as those shown in FIG. 2.

The OD amount calculation circuit 16*b* shown in FIG. 3 generates, by using the Y element value generation circuit 26, Y element values of pixels of the current frame. Next, the RGB element value restoration circuit 22*b* restores R-, G-, and B-element values of pixels of the previous frame based on Y-element values of pixels of the previous frame read from the frame memory 14, Y-element values of pixels of the current frame that the Y element value generation circuit 26 generated, and R-, G-, and B-element values of pixels of the current frame. Finally, the look-up tables 24R, 24G, and 24G outputs OD amounts for R, G, and B elements of respective pixels of the current frame based on R-, G-, and B-element values of respective pixels of the previous frame that the RGB element value restoration circuit 22*b* restored and R-, G-, and B-element values of corresponding pixels of the current frame.

Next, an equivalency between the process in the RGB element value restoration circuit 22*a* shown in FIG. 2 and the process in the RGB element value restoration circuit 22*b* is examined.

Assuming that A' to F' are appropriate coefficients to convert from Y-, U-, and V-element values to R-, G-, and B-element values, the process in the RGB element value restoration circuit 22*a* may be expressed by following equations.

$$R\ (\text{previous})=Y\ (\text{previous})+A'\times U+B'\times V$$

$$G\ (\text{previous})=Y\ (\text{previous})+C'\times U+D'\times V$$

$$B\ (\text{previous})=Y\ (\text{previous})+E'\times U+F'\times V \quad (1)$$

Here, U and V represent U- and V-element values, respectively, of corresponding pixels of the current frame.

On the other hand, assuming that differences between U- and V-element values of successive frames are negligibly small, R-, G-, and B-element values of respective pixels of the current frame may be expressed by following equations.

$$R\ (\text{current})=Y\ (\text{current})+A'\times U+B'\times V$$

$$G\ (\text{current})=Y\ (\text{current})+C'\times U+D'\times V$$

$$B\ (\text{current})=Y\ (\text{current})+E'\times U+F'\times V \quad (1)$$

The equations above may be transformed by moving "Y(current)" to the left side as follows.

$$R\ (\text{current})-Y\ (\text{current})=+A'\times U+B'\times V$$

$$G\ (\text{current})-Y\ (\text{current})=+C'\times U+D'\times V$$

$$B\ (\text{current})-Y\ (\text{current})=+E'\times U+F'\times V \quad (3)$$

Accordingly, the equations (1) of the RGB element value restoration circuit 22*a* shown above may be transformed to following equations.

$$R\ (\text{previous})=Y\ (\text{previous})+R\ (\text{current})-Y\ (\text{current})$$

$$G\ (\text{previous})=Y\ (\text{previous})+G\ (\text{current})-Y\ (\text{current})$$

$$B\ (\text{previous})=Y\ (\text{previous})+B\ (\text{current})-Y\ (\text{current}) \quad (4)$$

That is, R-, G-, and B-element values of respective pixels of the previous frame may be expressed by Y-element values of respective pixels of the previous frame, Y-element values of corresponding pixels of the current frame, and R-, G-, and B-element values of corresponding pixels of the current frame. The process in the RGB element value restoration circuit 22*b* is performed according to these equations.

The analysis explained above shows that the RGB element value restoration circuits 22*a* and 22*b* perform equivalent processes.

The RGB element value restoration circuit 22*a* requires U- and V-element values, or values of two of Y, U, and V elements, that the UV element value generation circuit 20 generated from R-, G-, and B-element values of pixels of the current frame. On the other hand, the RGB element value restoration circuit 22*b* requires Y-element values, or values of only one of Y, U, and V elements, that the Y element value generation circuit 26 generated from R-, G-, and B-element values of pixels of the current frame. Further, the process in the RGB element value restoration circuit 22*b* represented by the equations (4) do not include multiplications. Accordingly, the process of the OD amount calculation block 16*b* is easier, and may be implemented with a smaller circuit, than the process of the OD amount calculation block 16*a*.

When RGB format color image data is input, as shown in FIGS. 1 to 3, Y-element values that the Y element value generation circuit generated are stored in the frame memory. And R-, G-, and B-element values of pixels of the previous frame are restored by using Y-element values of pixels of the previous frame read from the frame memory and R-, G-, and B-element values of pixels of the current frame.

On the other hand, when YUV format color image data is input, Y-element values of pixels of the input color image data may be stored in the frame memory. And R-, G-, and B-element values of pixels of the previous frame may be restored by using Y-element values of pixels of the previous frame read from the frame memory and the color image data of pixels of the current frame. In this case, the RGB element value restoration circuit 22*a* shown in FIG. 2 or the RGB element value restoration circuit 22*b* shown in FIG. 3 may also be used.

Next, operation of the image processing apparatus 10 will be explained. During a period that the image processing apparatus 10 receives color image data of a frame, the image processing apparatus generates, by using the Y element value generation circuit 12, Y-element values of respective pixels from R-, G-, and B-element values in color image data (RGB input) of the current frame. Further, the image processing apparatus 10 stores generated Y-element values of the current frame in the frame memory 14.

Next, during a period that the image processing apparatus receives color image data of a next frame, by using the OD amount calculation block 16, the image processing apparatus calculates overdrive amounts for respective pixels of the current frame base on Y-element values of pixels of the previous frame read from the frame memory 14 and R-, G-, and B-element values of corresponding pixels of the current frame.

Finally, by using the adder 18, the image processing apparatus 10 adds calculated overdrive amounts for respective pixels of the current frame and R-, G-, and B-element values of corresponding pixels of the current frame, and generates corrected color image data (RGB output) for overdriving liquid crystal displays.

In the image processing apparatus 10, the frame memory 14 only stores Y-element values of pixels of each frame. Accordingly, compared with a case that all of R-, G-, and B-element values are stored in the frame memory 14, the capacity of the frame memory can be decreased to about ⅓. It is also possible to further decrease the capacity of the frame memory by, for example, quantizing or compressing the Y-element values that the Y element value generation circuit 12 generated.

Also in such cases, the OD amount calculation block 16 restores R-, G-, and B-element values of pixels of the previous frame based on R-, G-, and B-element values of respective pixels of the current frame and Y-element values of corresponding pixels of the previous frame. Thereby, color blurring at boundaries between objects with different colors can be suppressed.

Depending on characteristics of the color image data, a rate of compression may be increased. As a result, compressed image data including values of entire color elements may be stored in the frame memory 14 having a limited capacity. Accordingly, it is possible to construct an image processing apparatus to 1) store compressed image data including values of entire color elements in the frame memory 14 when it is possible, and 2) store compressed image data that only includes Y-element values in the frame memory when it is impossible to store compressed image data including values of entire color elements.

For example, values of entire color elements of simple images such as an image that a single object moves with a constant velocity before a homogeneous background may be compressed with a high compression rate and can be stored in the frame memory 14. In such simple images, human eyes can easily recognize effects of overdrive. Accordingly, it might be impossible to realize a sufficient display quality by calculating OD amounts by using Y-element values of the previous frame alone.

It is possible to construct an image processing apparatus to store values of entire color elements in the frame memory 14 and utilize them in the overdrive process when an image quality realized by the overdrive process by using Y-element values alone is insufficient. By reading compressed image data including values of entire RGB elements of the previous frame and comparing them with values of RGB elements of the current frame, a highly accurate overdrive process is enabled. Thereby, higher display quality can be realized.

On the other hand, for example, when a spatial frequency of the image is high, or when a large number of objects are randomly arranged in entire portions of the frame, it is difficult to increase the compression rate. In such cases, it is necessary to compress Y-element values alone to store in the frame memory having a limited capacity. However, in such cases, human eyes cannot easily recognize effects of overdrive. Accordingly, a sufficient display quality can be realized by storing Y-element values alone in the frame memory 14 and performing the overdrive.

Figure 4:
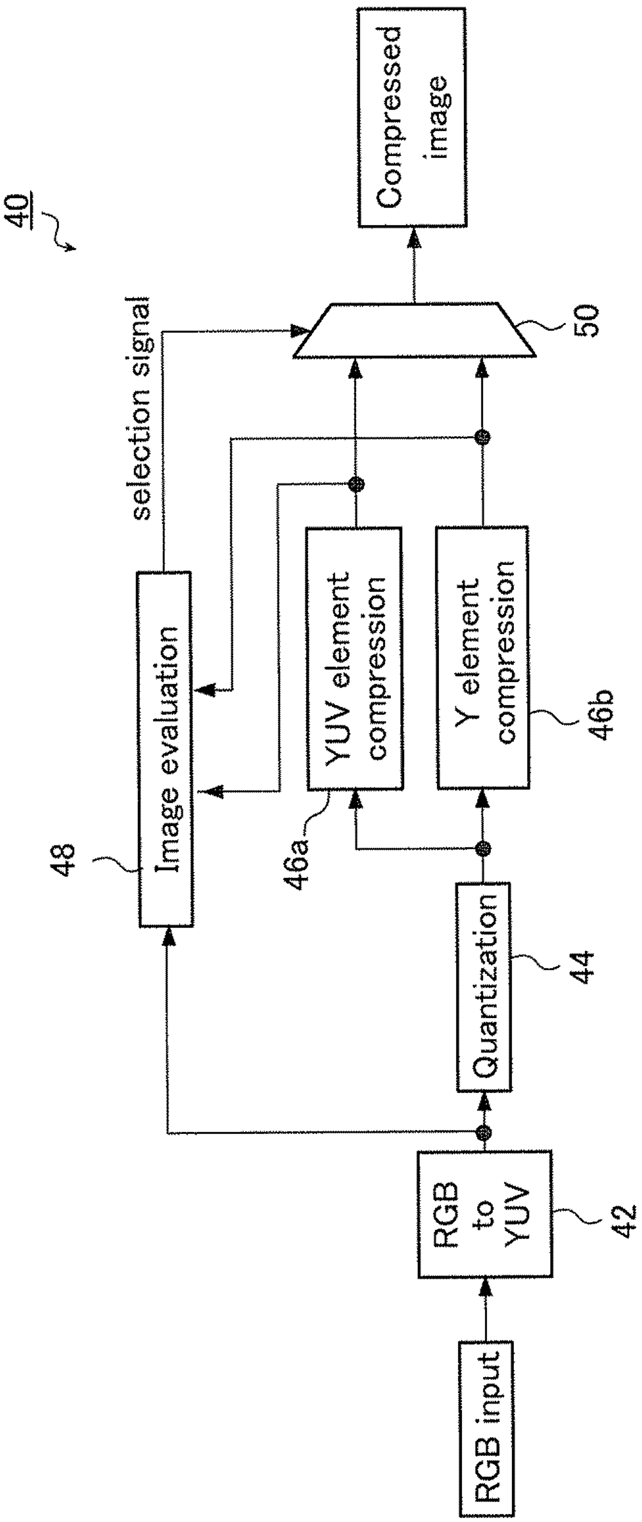
FIG. 4 is a block diagram showing an exemplary construction of a compression block that includes two compression circuits.

FIG. 4 is a block diagram showing an exemplary construction of a compression block that includes two compression circuits. The two compression circuits generate two sets of compressed image data by compressing Y-element values alone and values of entire color elements, respectively.

The exemplary compression block 40 shown in FIG. 4 includes YUV element value generation circuit (RGB to YUV) 42, quantization block 44, a first and a second compression circuit (YUV element value compression circuit and Y element value compression circuit) 46*a* and 46*b*, an image evaluation block 48, and a selector 50. The exemplary compression block 40 may be utilized to substitute, for example, the Y element value generation circuit 12 in the exemplary image processing circuit 10 shown in FIG. 1.

In this case, a de-compression block that expands the compressed image data of the previous frame read from the frame memory 14 may be provided between the frame memory 14 and the OD amount calculation block 16. The de-compressed image data may be compared with image data of the present frame.

The YUV element value generation circuit 42 generates Y-, U-, and V-element values from R-, G-, and B-element values of the input image data. The calculation equation described above may be used to generate the Y-element values. U- and V-element values may be generated by using calculation equations of, for example, $U=0.500R-0.419G-0.081B$ and $V=-0.169R-0.332G+0.500B$. When the input image data is represented by Y-, U-, and V-element values, on the other hand, the YUV element value generation circuit 42 is not required.

Next, the Y-, U-, and V-element values generated by the YUV element value generation circuit 42 are quantized by the quantization circuit 44 to generate quantized Y-, U-, and V-element values. The quantized Y-, U-, and V-element values are input to the first and second compression circuits 46*a* and 46*b*. The first compression circuit 46*a* compresses Y-, U-, and V-element values and generates compressed image data including all of Y-, U-, and V-element values. The second compression circuit 46*b* only compresses Y-element values and generates compressed image data including Y-element values alone.

The first and second compression circuits 46*a* and 46*b* compress input image data by, for example, grouping a plurality of pixels and performing a variable-length coding. As a result, sizes of the compressed data, or the compression rate, varies depending on characteristics of the input image data. For example, the compression rate may depend on spatial frequency of the input image data. More specifically, when the spatial frequency is low, the compression rate becomes high and the size of compressed image data decreases.

The selector 50 selects one of the first compressed image data including all of Y-, U-, and V-element values that the first compression circuit 46*a* generated and the second compressed image data only including Y-element values that the second compression circuit 46*b* generated, and output selected one of the image data as the compressed image data. The image evaluation circuit 48 evaluates input image data or the compressed image data, and generates and outputs a selection signal based on the result of the evaluation to the selector 50.

The image evaluation circuit 48 may perform the evaluation by, for example, measuring a data size of the compressed image data and generate the selection signal. Specifically, for example, the image evaluation circuit 48 may measure a size of the first compressed image data that the first compression circuit 46*a* generated. When the size of the first compresses image data is not larger than a standard value, the image evaluation circuit 48 determines that the first compressed image data of a frame can be stored in the frame memory 14 and generates a selection signal that selects the first compressed image data. When the size of the first compressed image data is larger than the standard value, on the other hand, the image evaluation circuit 48 generates a selection signal that selects the second compressed image data.

When the image data evaluation and the selection signal generation in the image evaluation circuit 48 is performed, although it is omitted in FIG. 4, a buffer may be provided between the first and second compression circuit 46*a* and 46*b* and the selector 50. The buffer delay the timing of imputing the first and second compressed image data into the selector 50 while evaluating the image data and generating the selection signal.

It is also possible to generate the selection signal by evaluating RGB or YUV image data before the compression. For example, it is possible to evaluate frequency and amplitude of variation of each element in a certain number of pixels. When the frequency and amplitude of variation are not larger than respective standard values, the image evaluation circuit 48 may determine that a high compression rate can be obtained and that the first compressed image data can be stored in the frame memory 14. In this case, the image evaluation circuit may generate a selection signal that selects the first compressed image data. When the frequency and amplitude of variation are larger than respective standard values, on the other hand, the image evaluation circuit 48 may generate a selection signal that selects the second compressed image data.

It is further possible to generate and store compressed image data including all of R-, G-, and B-element values in the frame memory 14, instead of compressed image data including Y-, U-, and V-element values. In this case, a compression circuit that generates compressed image data including all of R-, G-, and B-element values is provide as the first compression circuit 46*a*, and input image data including R-, G-, and B-element values is input to this compression circuit.

When the selection of compression circuit changes within a frame, the change of image quality may become noticeable. In order to prevent this phenomenon, it is possible to provide a detection circuit that detects starts of a frame and lines within each frame in the compression block 40. The detection circuit may generate a control signal that permits the image evaluation circuit 48 to update the selection signal based on the result of image evaluation only during a predetermined first period, or during a first few lines, and prohibits the image evaluation circuit to update the selection signal thereafter in each frame. Starts of a frame and lines may be detected by monitoring a level of vertical synchronization signal and a level of data valid signal input with the image data.

The compressed image data including all of Y-, U, and V element values stored in the frame memory 14 may be read from the frame memory and the de-compression block may restore the Y-, U-, and V-element values of the previous frame. The restored Y-, U-, and V-element values of the previous frame may be input to, for example, the RGB element value restoration circuit 22*a* of the OD amount calculation block 16*a* shown in FIG. 2. In order to enable to input Y-, U-, and V-element values of the previous frame to the RGB element value restoration circuit 22*a*, it is possible to provide a selector at the input-side of the RGB element value restoration circuit 22*a*. The selector may select one of U- and V-element values that the UV element value generation circuit 20 generated and U- and V-element values that the de-compression circuit restored.

The selector provided in the OD amount calculation block 16*a* may include means to hold the selection signal supplied to the selector 50 of the compression block 40 shown in FIG. 4 after the prohibition of updating the selection signal. The held selection signal may be used as a selection signal of the selector in the OD amount calculation block 16*a* during the next frame period.

When the OD amount calculation block 16*b* shown in FIG. 3 is used, a transformation circuit that transforms Y-, U-, and V-element values of the previous frame restored by the de-compression block to R-, G-, and B-element values of the previous frame may be provided. The output of the transformation circuit may be input, instead of the R-, G-, and B-element values that the RGB element value restoration circuit 22*b* restored, to the LUTs 24R, 24G, and 24B.

When compressed image data including R-, G-, and B-element values is stored in the frame memory 14, the R-, G-, and B-element values of the previous frame read from the frame memory and de-compressed by the de-compression block may be input, instead of R-, G-, and B-element values of the previous frame restored by the RGB element value restoration circuit 22*a* or 22*b* shown in FIG. 3 or 4, to LUTs 24R, 24G, and 24B.

Figure 5:
FIG. 5 shows an exemplary natural image used to examine the effect of an exemplary embodiment of this disclosure.

An effect of an exemplary embodiment of this disclosure for an exemplary natural image shown in FIG. 5 was examined. Specifically, the original image shown in FIG. 5 was scrawled to the right direction with a speed of 4 pixels/frame, and overdrive was performed.

Figure 6:
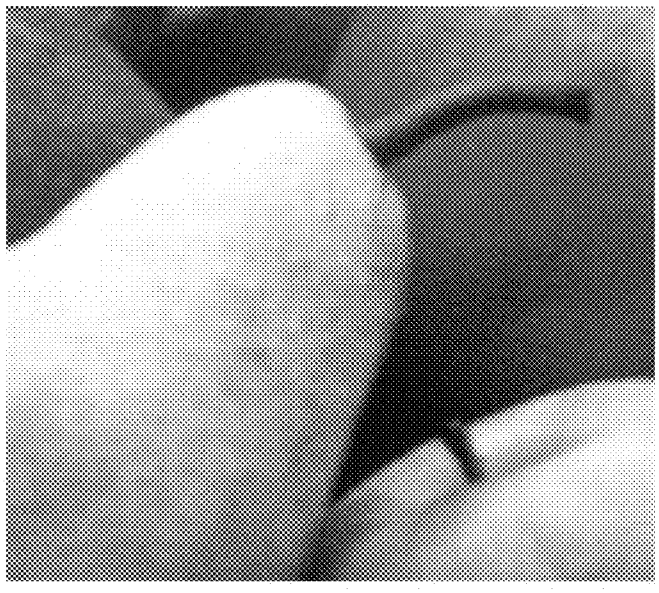
FIG. 6 shows a comparative embodiment where the overdrive is performed only for Y-element values.
Figure 7:
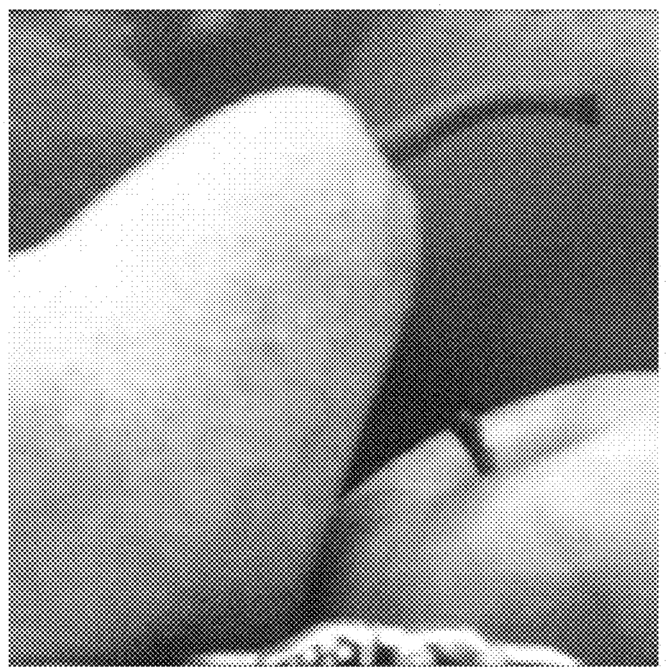
FIG. 7 shows an exemplary embodiment where overdrive is performed by using R-, G-, and B-element values of the previous frame restored from Y-element values.
Figure 8:
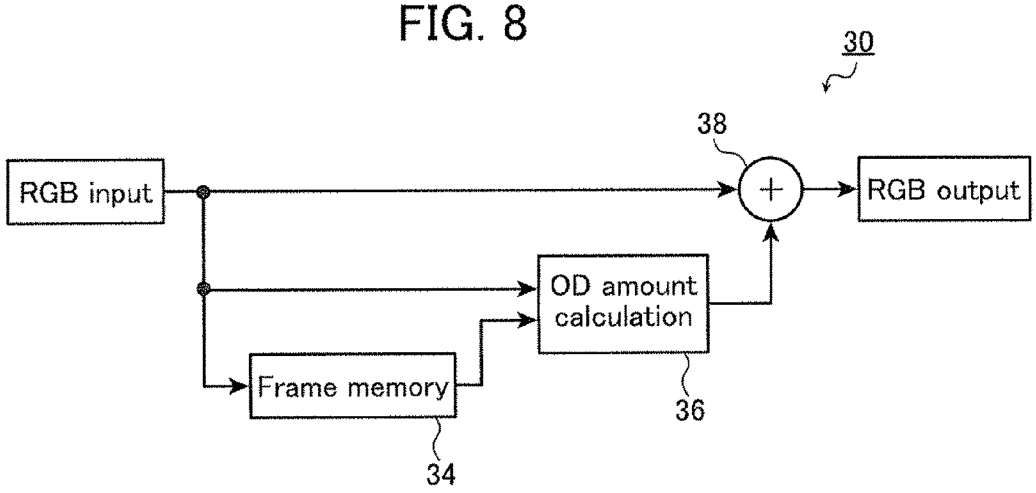
FIG. 8 is a block diagram that shows a construction of a conventional image processing apparatus that performs overdrive.

FIG. 6 shows a comparative embodiment where the overdrive is performed only for Y-element values. On the other hand, FIG. 7 shows an exemplary embodiment where overdrive is performed by using R-, G-, and B-element values of pixels of the previous frame restored from Y-element values of pixels of the previous frame, Y-element values of pixels of the current frame, and R-, G-, and B-element values of pixels of the current frame. As can be seen by comparing FIGS. 6 and 7, blurring of red color at the right boarder of the pear is less noticeable in FIG. 7. Accordingly, it is proved that the exemplary embodiment provides an improved display quality.

In practice, the Y element value generation circuit 12, the restoration block, which may be constituted by the UV element value generation circuit 20 and the RGB element value restoration circuit 22*a* or the Y element value generation circuit 26 and the RGB element value restoration circuit 22*b*, and the correction block, which may be constituted by the LUT 24R, 24G and 24B and the adder 18, may be integrated in a signal semiconductor integrated circuit chip. The semiconductor integrated circuit chip can be used as an apparatus to process color image data together with a frame memory that store the Y-element values of respective pixels.

Further, the semiconductor integrated circuit chip and a frame memory chip may be assembled in a signal package to constitute a device that can be used as a complete image processing apparatus. Note that, it is not necessary to integrate the Y element value generation circuit 12 in the semiconductor integrated circuit chip when YUV format color image data is input. Further, the compression block 40 may be integrated in the semiconductor integrated circuit chip instead of the Y element value generation circuit 12.

Various exemplary apparatuses and methods of this disclosure restore R-, G-, and B-element values of pixels of previous frame based on Y-element values of pixels of the previous frame and color image data of the current frame, and generate corrected image data by comparing the restored RGB-element values of pixels of the previous frame and RGB-element values of corresponding pixels of the current frame. Accordingly, it is only required to store Y-element values in a frame memory and a capacity of the frame memory can be reduced. Furthermore, degradation of display quality can be suppressed.

The exemplary embodiment described above utilizes RGB color format as inputting and outputting color image formats. It is also possible to utilize other color formats such as YUV color format. Constructions of the Y element value generation circuit and the OD amount calculation block may be modified as long as their functions are realized.

What is claimed is:

1. An image processing apparatus that receives color image data of successive frames and outputs corrected color image data, the apparatus comprising:

a frame memory that stores Y-element values of respective pixels of a previous one of the successive frames;

a restoration block that restores R-, G-, and B-element values of the respective pixels of the previous one of the successive frames based on the Y-element values of the respective pixels of the previous one of the successive frames read from the frame memory and the color image data of a current one of the successive frames, which is next to the previous one of the successive frames; and a correction block that compares the R-, G-, and B-element values of the respective pixels of the previous one of the successive frames that the restoration block restored and R-, G-, and B-element values of corresponding pixels of the current one of the successive frames and generates the corrected color image data.

2. The apparatus according to claim 1, wherein:

the restoration block restores the R-, G-, and B-element values of the respective pixels of the previous one of the successive frames based on the R-, G-, and B-element values of the corresponding pixels of the current one of the successive frames and the Y-element values of the respective pixels of the previous one of the successive frames read from the frame memory.

3. The apparatus according to claim 2, wherein:

the restoration block includes a UV element value generation circuit that generates U- and V-element values of the corresponding pixels of the current one of the successive frames based on the R-, G-, and B-element values of the corresponding pixels of the current one of the successive frames; and the restoration block restores the R-, G-, and B-element values of the respective pixels of the previous one of the successive frames based on the U- and V-element values of the corresponding pixels of the current one of the successive frames that the UV element value generation circuit generated and the Y-element values of the respective pixels of the previous one of the successive frames read from the frame memory.

4. The apparatus according to claim 2, wherein:

the restoration block includes a Y element value generation circuit that generates Y-element values of the corresponding pixels of the current one of the successive frames based on the R-, G-, and B-element values of the corresponding pixels of the current one of the successive frames; and the restoration block restores the R-, G-, and B-element values of the respective pixels of the previous one of the successive frames based on the Y-element values of the corresponding pixels of the current one of the successive frames that the Y element value generation circuit generated, the Y-element values of the respective pixels of the previous one of the successive frames read from the frame memory, and the R-, G-, and B-element values of the corresponding pixels of the current one of the successive frames.

5. The apparatus according to claim 1, further comprising:

a compression block that compresses received color image data into a first compressed image data that includes one of i) R-, G-, and B-element values and ii) Y-, U-, and V-element values and a second compressed image data that only includes Y-element values and selects one of the first and second compressed image data to be stored in the frame memory, wherein, when the compression block selects the first compressed image data:

the restoration block generates the R-, G-, and B-element values of the respective pixels of the previous one of the successive frames based on the first compressed image data read from the frame memory; and the correction block compares the R-, G-, and B-element values of the respective pixels of the previous one of the successive frames that the restoration block generated and the R-, G-, and B-element values of the corresponding pixels of the current one of the successive frames and generates the corrected color image data.

6. The apparatus according to claim 5, wherein the compression block further includes:

an evaluation circuit that performs an evaluation of at least one of the received color image data and the first compressed image data and performs a selection of one of the first and second compressed image data based on a result of the evaluation; and a detection circuit that detects a start of each of the frames in the received color image data and permits the evaluation circuit to update the selection only during a predetermined first period in each of the frames.

7. An image processing apparatus that receives color image data of successive frames and outputs corrected color image data, the apparatus comprising:

a restoration block that restores R-, G-, and B-element values of respective pixels of a previous one of the successive frames based on Y-element values of the respective pixels of the previous one of the successive frames and the color image data of a current one of the successive frames, which is next to the previous one of the successive frames; and a correction block that compares the R-, G-, and B-element values of the respective pixels of the previous one of the successive frames that the restoration block restored and R-, G-, and B-element values of corresponding pixels of the current one of the successive frames and generates the corrected color image data.

8. The apparatus according to claim 7, wherein:

the restoration block restores the R-, G-, and B-element values of the respective pixels of the previous one of the successive frames based on the R-, G-, and B-element values of the corresponding pixels of the current one of the successive frames and the Y-element values of the respective pixels of the previous one of the successive frames.

9. The apparatus according to claim 8, wherein:

the restoration block includes a UV element value generation circuit that generates U- and V-element values of the corresponding pixels of the current one of the successive frames based on the R-, G-, and B-element values of the corresponding pixels of the current one of the successive frames; and the restoration block restores the R-, G-, and B-element values of the respective pixels of the previous one of the successive frames based on the U- and V-element values of the corresponding pixels of the current one of the successive frames that the UV element value generation circuit generated and the Y-element values of the respective pixels of the previous one of the successive frames.

10. The apparatus according to claim 9, wherein:

the restoration block includes a Y element value generation circuit that generates Y-element values of the corresponding pixels of the current one of the successive frames based on the R-, G-, and B-element values of the corresponding pixels of the current one of the successive frames; and the restoration block restores the R-, G-, and B-element values of the respective pixels of the previous one of the successive frames based on the Y-element values of the corresponding pixels of the current one of the successive frames that the Y element value generation circuit generated, the Y-element values of the respective pixels of the previous one of the successive frames, and the R-, G-, and B-element values of the corresponding pixels of the current one of the successive frames.

11. A method of processing color image data, comprising:

receiving color image data of successive frames;

storing Y-element values of respective pixels of a previous one of the successive frames in a frame memory;

restoring R-, G-, and B-element values of the respective pixels of the previous one of the successive frames in a semiconductor integrated circuit chip based on the Y-element values of the respective pixels of the previous one of the successive frames read from the frame memory and the color image data of a current one of the successive frames, which is next to the previous one of the successive frames;

comparing the restored R-, G-, and B-element values of the respective pixels of the previous one of the successive frames and R-, G-, and B-element values of corresponding pixels of the current one of the successive frames to generate a corrected color image data; and outputting the corrected color image data.

12. The method according to claim 11, wherein:

the restoring restores the R-, G-, and B-element values of the respective pixels of the previous one of the successive frames based on the R-, G-, and B-element values of the corresponding pixels of the current one of the successive frames and the Y-element values of the respective pixels of the previous one of the successive frames read from the frame memory.

13. The method according to claim 12, wherein:

the restoring further includes generating U- and V-element values of the corresponding pixels of the current one of the successive frames based on the R-, G-, and B-element values of the corresponding pixels of the current one of the successive frames; and the restoring restores the R-, G-, and B-element values of the respective pixels of the previous one of the successive frames based on the generated U- and V-element values of the corresponding pixels of the current one of the successive frames and the Y-element values of the respective pixels of the previous one of the successive frames read from the frame memory.

14. The method according to claim 12, wherein:

the restoring further includes generating Y-element values of the corresponding pixels of the current one of the successive frames based on the R-, G-, and B-element values of the corresponding pixels of the current one of the successive frames; and the restoring restores the R-, G-, and B-element values of the respective pixels of the previous one of the successive frames based on the generated Y-element values of the corresponding pixels of the current one of the successive frames, the Y-element values of the respective pixels of the previous one of the successive frames read from the frame memory, and the R-, G-, and B-element values of the corresponding pixels of the current one of the successive frames.

15. The method according to claim 11, further comprising:

compressing received color image data into a first compressed image data that includes one of i) R-, G-, and B-element values and ii) Y-, U-, and V-element values and a second compressed image data that only includes Y-element values and selecting one of the first and second compressed image data to be stored in the frame memory, wherein, when the selecting selects the first compressed image data:

the restoring generates the R-, G-, and B-element values of the respective pixels of the previous one of the successive frames based on the first compressed image data read from the frame memory; and the comparing compares the generated R-, G-, and B-element values of the respective pixels of the previous one of the successive frames and the R-, G-, and B-element values of the corresponding pixels of the current one of the successive frames.

16. The method according to claim 15, wherein the selecting further includes:

evaluating at least one of the received color image data and the first compressed image data and selecting the one of the first and second compressed image data based on a result of the evaluating; and detecting a start of each of the frames in the received color image data and permitting the selecting only during a predetermined first period in each of the frames.

* * * * *